Figure 1:
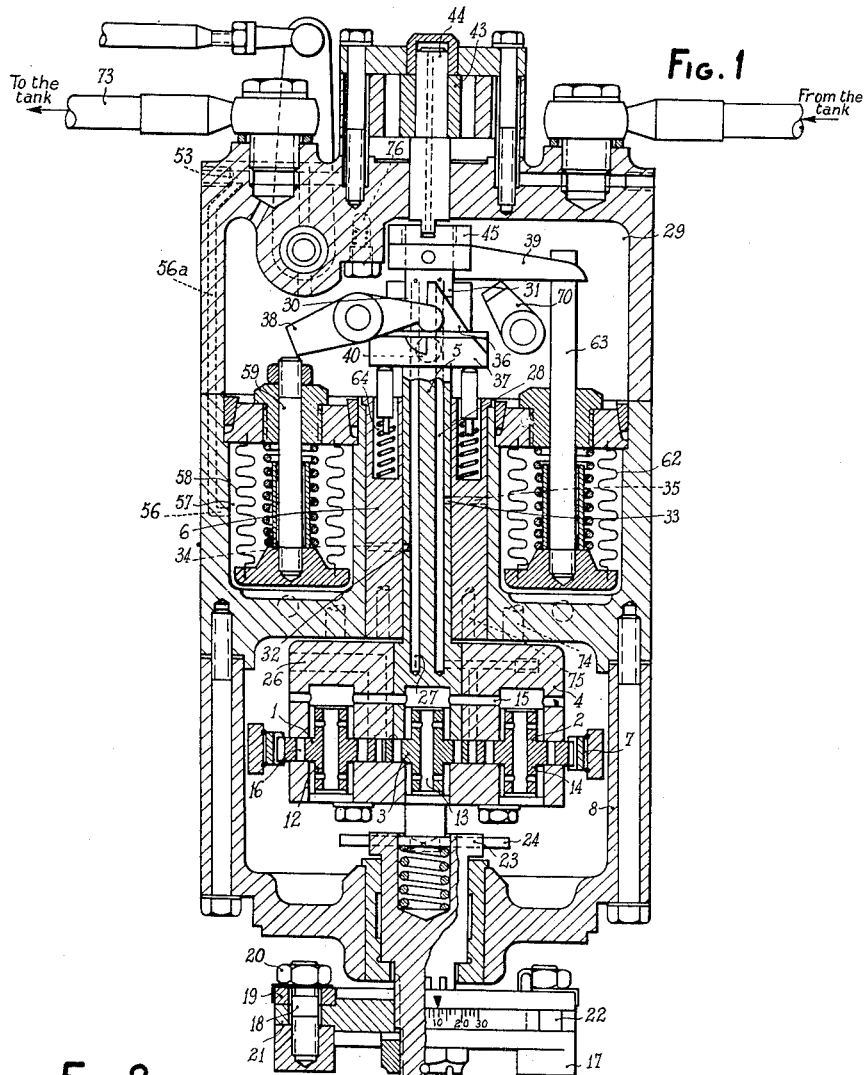
Figure 2:
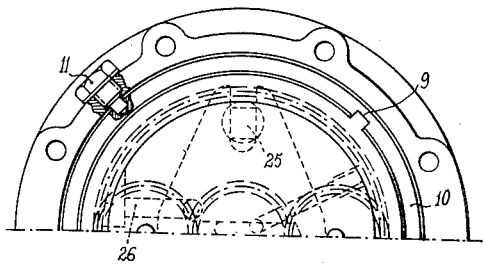
Figure 3:
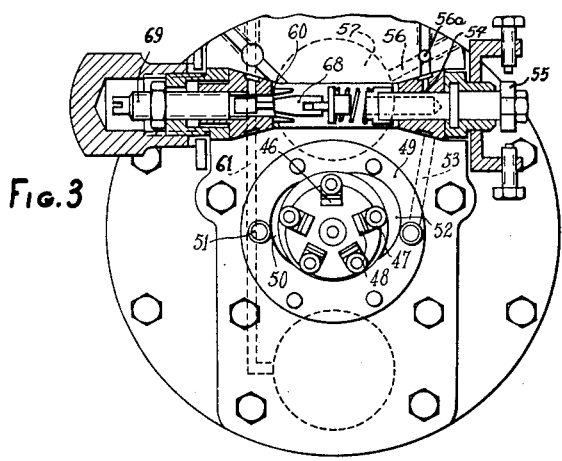
Figure 4:
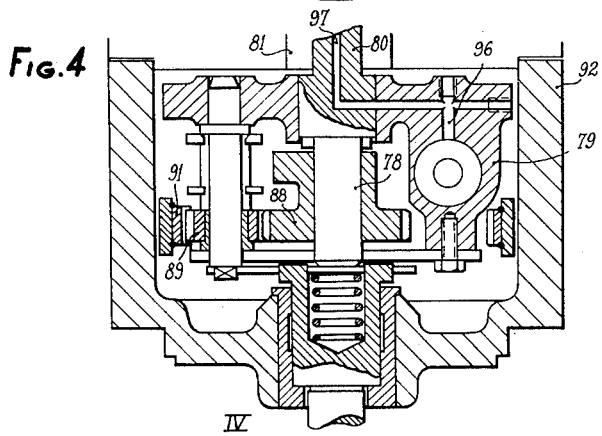
Figure 5:
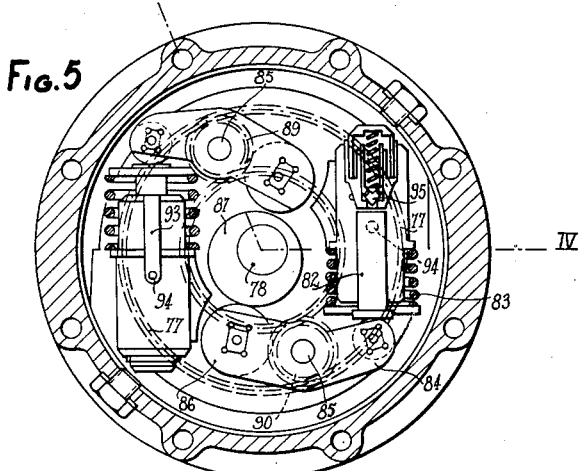
Figure 6:
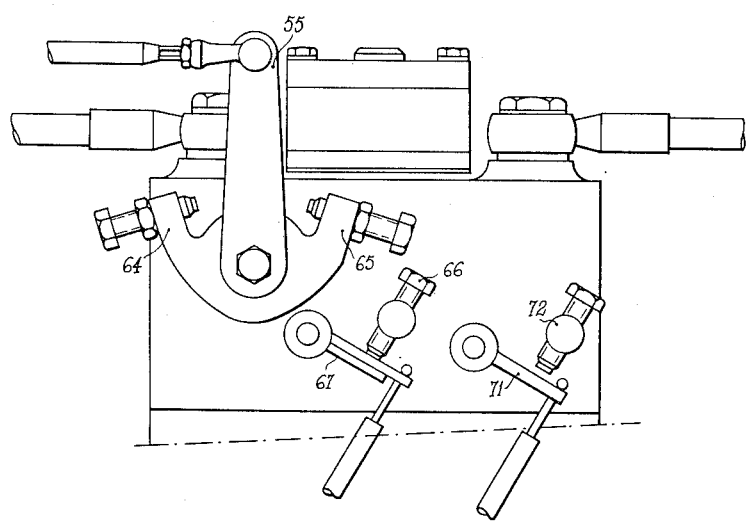
Figure 7:
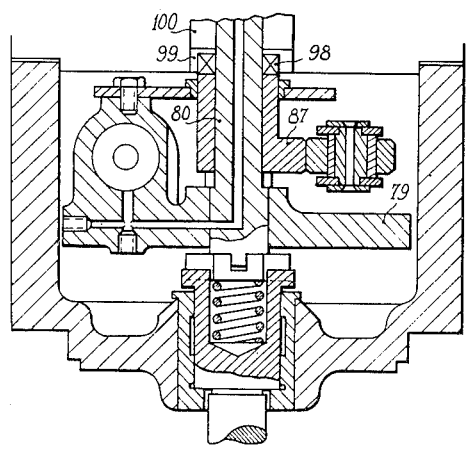

Dec. 23, 1952  J. M. R. RETEL  2,622,577
FUEL INJECTION PUMP
Filed Dec. 6, 1948  3 Sheets-Sheet 1

INVENTOR:
J. M. R. RETEL
By Wenderoth, Lind & Ponack
ATTORNEYS

INVENTOR:
J. M. R. RETEL
By Wenderoth, Lind &
Ponack
ATTORNEYS

Dec. 23, 1952 J. M. R. RETEL 2,622,577
FUEL INJECTION PUMP
Filed Dec. 6, 1948 3 Sheets-Sheet 3

INVENTOR:
J. M. R. RETEL
By Wenderoth, Lind & Ponack
ATTORNEYS

Patented Dec. 23, 1952

2,622,577

UNITED STATES PATENT OFFICE 2,622,577

FUEL-INJECTION PUMP

Jules Marie René Retel, Neuilly-sur-Seine, France

Application December 6, 1948, Serial No. 63,792
In France December 12, 1947

10 Claims. (Cl. 123—139)

This invention relates to fuel-injection pumps, in particular for internal combustion engines.

It is a general object of the invention to provide an improved fuel-injection pump assembly in which fuel is placed under pressure and pumped into a plurality of injection nozzles with an accurately predetermined and adjustable sequence of timing by a novel combination of volumetric pumping units and related mechanism.

It is an object to provide such a device in which the desired operation is obtained by means of one or more volumetric pumping units discharging into a discharge circuit formed in a rotor shaft co-operating with a ported liner member communicating with said injection nozzles, the desired timing sequence being secured by a castellated timing member adapted to seal in a desired timed sequence so-called "discharge" ports formed in another section of said shaft, so as to create in said discharge circuit pressure surges operative to force the fuel therefrom through said ported liner into said injection nozzles.

Another object is to provide in such a device pressure-responsive regulating means to automatically adjust both the duration of the injection periods and the point in each cycle at which said periods start, in response to the prevailing speed and load conditions of the engine.

A further object is to provide such devices which are adapted for use in connection with engines having various numbers of cylinders.

Other important objects of the invention will appear as the description proceeds.

The invention provides a fuel injection pump which comprises in combination with volume pumps adapted to discharge intermittently or continuously into a discharge circuit defined within a rotary slide-valve member operative to connect said circuit successively with the intakes of a plurality of injector nozzles, a ported ring slidable over said rotary slide-valve member and adapted to seal, throughout a predetermined angle of rotation of said slide-valve, the discharge outlet of said pump so as to create pressure surges of corresponding predetermined duration, thereby causing in turn the injection of correspondingly determined amounts of fuel, said ring being angularly adjustable to enable control of the injection period or angle, and thus to permit suitable control or timing of the injection lead.

Some exemplary embodiments of the invention will now be described for purposes of illustration only and not of limitation, with reference to the accompanying drawings wherein:

Fig. I is a diagrammatical view in elevation and vertical section of a pump device according to the invention designed for use with an 8-cylinder engine.

Fig. II is half a plan view of the same device.

Fig. III is a view in plan showing the general arrangement of the common pump used to supply fuel to the device of the invention.

Figs. IV and V are views in vertical and horizontal section, respectively, of a modification in which the pumping units used comprise plunger-operated rather than meshing-gear type pumps, and as applied to a 4-cylinder engine.

Fig. VI is an outside view showing parts of the control means used.

Fig. VII is a fragmentary vertical section relating to a modification.

As shown in Fig. I, the fuel pump assembly of my invention comprises pinions 1 and 2 symmetrically arranged on both sides of a freely rotatable central pinion 3 coaxial with a rotor 4, said rotor being integral with a rotary slide-valve 5 mounted for rotation in a cylindrical liner 6. The pinions 1 and 2 are adapted to mesh with a fixed external annular gear 7 connected with the casing 8 through an Oldham type of joint comprising a pair of keys 9 (see Fig. II), a circumferential spider member 10 and a pair of pins 11 journalled in the casing. The provision of a connection of the type described or an equivalent one is essential in order to avoid the production of an excessive reaction from the slide-valve against the housing thereof.

The pinion shafts 12, 13 and 14 of the pinions constituting the gear-pump are recessed and allow a continuous flow of liquid therethrough, as delivered under centrifugal action through the conduits 15. The pump rotors are formed with apertures 16 serving the function of expansion or pressure-balancing means and moreover operating to cool the rotors, and also to permit lubrication of the bearing surfaces.

The rotor 4 is driven at the speed of the engine if the latter is a two-stroke engine, and at half the speed of the engine if the latter is a 4-stroke engine, the driving connection being effected through a coupling disc 17 formed with projections as shown and connected with the cooperating coupling disc 19 through pins 18.

Clamping the second coupling disc 19 by means of the nuts 20 will cause the disc 21 to be driven in rotation, said disc 21 being in turn keyed on the drive shaft of the pump. The disc 21 is formed with slots through which extend the above-mentioned pins 18, and it is further provided with key-sockets 22, whereby it is possible to impart any desired angular setting to the pump and the engine shafts.

The pump shaft drives the rotor through an Oldham joint comprising a key 23, a disc 24 and the milled or flatted extremities of two pins 25 rigid with the rotor.

The above-described device operates as follows:

The rotor when rotated rotates in turn both pinions 1 and 2 meshing with the fixed annulus 7. The fuel which fills the casing 8 is drawn in through the conduits 26 and discharged under pressure by each of the respective pump units into the ducts 27 and 28 formed in the rotary slide valve 5, whence the fuel is discharged into the casing 29 through the discharge apertures 30 and 31. Ports 32 and 33 provide communication from said ducts alternately and successively to the intake ports 34 and 35 of the respective injector nozzles. The discharge apertures may be sealed by castellations or teeth 36 formed on a castellated ring 37 journalled on the slide valve 5. Whenever a discharge aperture 30 or 31 is sealed, the fuel will pass through the port 32 or the port 33 of the related duct and be delivered into and through that particular injector nozzle with which the said port is connected at the time.

The teeth 36 are formed with a tapering or decreasing width from the root to the top thereof, and it follows that the ports 30 and 31 may be sealed throughout an angle of greater or less extent according to the longitudinal setting of the movable ring 37, as controlled through the fork 38. On the other hand, if it is desired to alter the point in each cycle at which the injection period starts without altering the actual duration of said period, it will simply be necessary to rotate the ring by a given angle. Such rotation is made through the bell-crank lever 39 and finger 40 slidable in a notch formed in the ring 37.

The fuel necessary for the pump's operation is aspirated by a vaned pump 43 or if preferred a gear pump, said pump having a recessed shaft 44 driven from the slide-valve member through an Oldham connection 45.

According to a particularly desirable form of embodiment, the rotor of said last-mentioned pump comprises, see Fig. III, a number of sockets or recesses 46 formed therein, and recessed roller elements 47 are disposed in said sockets, with spring-plates 48 arranged to actuate said rollers 47. Said rollers, in moving to follow the eccentered profile of the outer race 49, will first define gradually increasing, then gradually decreasing volumes. The liquid is sucked in through the intake aperture 50 and the duct 51 during the period in which the volumes increase, then discharged through the outlet 52 and the duct 53 during the period of decreasing volumes.

The fuel thus discharged passes through a restricted or throttled aperture 54 whose sectional area may be varied by means of a control lever 55 or the like. A duct 56 transmits through duct 56a the fuel pressure prevailing upstream of the adjustable aperture 54 to a capacity or chamber 57 (Fig. I) defined by a yieldable diaphragm 58 the deformations of which are adapted to be transmitted to the fork 38 through a push-rod 59.

Downstream of the throttling restriction 54, the fuel (Fig. III) flows through an annular duct 60 having a very small sectional area as compared to its length, so as to cause the fuel to assume a condition of non-turbulent or laminar flow therethrough. The fluid pressure upstream of said laminar aperture is transmitted through the duct 61 to a second yieldable diaphragm 62 whose deformations are transmitted through a push-pull rod 63 acting on the end of the above-described bell-crank lever 39 which controls the finger 40. On flowing out of the annular aperture 60 the fuel enters the casing 29.

Operation is as follows:

On starting the engine, the operator pushes the lever 55 full forward (Fig. VI) so as to impart to the throttling restriction 54 (Fig. I) the greatest possible cross-sectional area.

Since the speed of the engine is low, the delivery pressure of the primary pump is low, the pressure-responsive seal 58 is in slack condition, the fork is raised and the ring 37 urged by the springs 53 to its uppermost position corresponding to the periods of maximum fuel injection. In the same way, because of the low output capacity of the supply pump, the pressure-responsive seal or diaphragm 62 is also slack, this condition corresponding to minimum injection-lead setting.

The engine being fed in full, its rate of rotation quickly increases until the operator pulls back the lever 55. The cross-sectional area of the throttle 54 thus being reduced, the pressure in the chamber 57 increases, the fork 38 pushes the ring 37 down, thus reducing the duration of the injection periods and also the amounts of fuel injected. The engine speed may thus be restricted to a predetermined value depending on the setting imparted to the lever 55.

Should the speed of the engine tend to drop because of an increase in the load torque, this would result in reducing the delivery output of the primary pump, thereby reducing in turn the pressure prevailing in the chamber 57. The yieldable seal diaphragm 58 is then slackened so that the fork will rise up again, and the movable ring will also rise, thus increasing the amounts of injected fuel and restoring the engine speed.

The reverse occurs in the event of a tendency of the engine to increase its speed.

Thus in short, it will be apparent that the speed of the engine depends on the setting imparted to the lever 55. In particular, idling and maximum speed conditions may be respectively defined with accuracy by means of limiting stops 64 and 65 (Fig. VI).

To prevent the engine from smoking when "picking up" or accelerating, it is desirable to restrict the amounts of fuel injected to a predetermined maximum value, and this may be done by means of an adjustable stop 66 limiting the stroke of the lever 67 rigid with the fork 38 and accordingly limiting the height of the ring 37.

A spring-urged flexible control cable makes it possible to positively cut off the fuel supply through actuation of the lever 67.

In another connection, the output of the primary pump being proportionate to the speed of the engine, is adapted, as the fuel flows through the throttling restriction 60, to create a pressure proportionate with said speed, thus resulting in a progressively increasing injection lead as the engine speed is increased. The maximum injection lead is adjusted by suitably calibrating the laminar throttle section 60, the tapered sealing plug-member 68 being for that purpose moved to an appropriate position by means of the screw 69 (Fig. III).

Minimum injection lead timing is controlled through the position of a finger 70 (Fig. 1) operable from outside the casing though a lever 71 (Fig. VI) and an adjustable stop 72. This arrangement makes it possible, by suitably operating the lever 71 through a flexible control, to temporarily set an abnormally high injection lead, this facilitating starting the engine in cold weather.

Any fuel pumped by the primary pump in excess of the engine's demands is returned to the tank through the pipe 73 after having been caused to flow through a by-pass if required.

Ducts 74 and 75 (Fig. I) unequally spaced from the axis of the rotor provide passage of the fuel from the casing 29 into the casing 8 and allow the air centrifugally separated as a result of the rotational to drain off into the tank as indicated in Fig. I. A by-pass 76 is provided to protect the primary pump from any pressure surges that inadvertent closure or obstruction of the throttles 54 and 60 might generate.

The arrangement described makes it possible to feed an eight-cylinder engine with a device comprising two gear-pumps, a slide-valve with two pipes, two discharge ports displaced 135° from each other and a ring with four teeth or castellations.

A six-cylinder engine may be fed with a similar device comprising two symmetrically arranged discharge ports and a ring with three castellations.

A pump for a two-cylinder engine will only comprise one central pipe, one discharge port and a ring with four castellations.

In the same way, pumps may be constructed for a twelve-cylinder engine with the use of 2, 3 or 4 gear pumps and a ring with 6, 4 or 3 castellations respectively.

While in the forms of embodiment described so far, the volume pumps comprised pumps of the meshing gear-type it is equally possible to employ vaned pumps, in particular pumps of a type similar to that described in connection with the pump used to supply fuel to the device as a whole. Pumps involving plungers actuated by cam-controlled rocker-arms may also be used.

One example of such a construction is illustrated in Figs. IV and V which show a pump designed for the feeding of a four-stroke four-cylinder engine.

In this modification, the volume pump comprises (Fig. V) two pump bodies or barrels 77 symmetrically disposed with respect to the axis 78 of rotor 79 rigid with the slide-valve 80 journalled in the liner 81 (Fig. IV). The pump barrels are sealed with pistons 82 urged by springs 83 against rocker-arms 84 pivoted on pins 85 rigid with the rotor. Each of said rocker-arms at its opposite end carries a follower roller 86 engaged by a cam 87 rotatable on the rotor-supporting shaft 80. Said cam is driven at an absolute speed of rotation three times that of the rotor by means of a pinion 88 meshing with two planetaries 89 and 90 meshing in turn with the annulus 91 connected with the casing 92 through an Oldham joint of a type similar to that previously described.

This modification of the invention operates as follows:

The fuel is aspirated into the pump barrel through the duct 93 and port 94. As the cam engages the rocker-arm, the piston seals the port 94, the fuel is placed under pressure and opens the check-valve 95 to flow through the duct 96 into the single central pipe 97 whence it is discharged into the casing through the discharge aperture or port formed in the slide-valve. If, during a discharge period, said port is sealed by a tooth of a castellated ring of the previously-described type, the fuel escapes through the injector nozzle with which the central pipe is at that time connected.

The arrangement just described makes it possible to feed a four-cylinder engine with a device comprising 2 pump barrels, one slide valve with a single central pipe, one discharge port, one ring with four castellations, and a single cam rotated at a speed three times the speed of the rotor. A similar result might be secured with a fixed cam having four bosses or high points arranged as described hereinafter.

A six or an eight-cylinder engine may be fed through similar devices comprising a single ring with three or four castellations, but in this case there would have to be two pipes and two discharge ports arranged symmetrically or displaced a suitable angle, and cams formed with one or more high points and driven at suitable rates.

A six-cylinder engine may be supplied with fuel by means of a single cam rotated at a speed four times that of the rotor, or alternatively a treble cam fixed or rotated at twice the speed of the rotor.

An eight-cylinder engine will require a single cam rotated at a speed in the ratio $$\frac{225}{45}$$

or a treble cam rotated at a speed in the ratio $$\frac{105}{45}$$

with respect to the speed of the rotor.

In the event the absolute speed of the cam is zero, a mechanical solution of the problem involved would be (Fig. VII) to mount the rotor 79 at the end of the slide-valve 80 and provide the cam 87 with projections 98 engaging notches 99 formed in the end of the liner 100 in which the slide-valve is journalled.

It will be obvious that the invention is by no means limited to the details of construction described. Thus, some conceivable modifications to the forms of construction shown may include:

The castellated rings may in some cases be advantageously replaced by ported valve members formed with sets of two or three ports adapted to cooperate with slanting or straight slots formed in the rotary slide-valve in order to permit adjustment of the respective periods throughout which the volume pumps are allowed to freely discharge fuel and there in which they are sealed.

The liners in which the rotary slide-valves are journalled may be constructed as composite assemblies including a variety of metals or alloys having substantially the same coefficient of thermal expansion as the slide-valve.

Thus, specifically in the case of steel pistons, liners may be used having an outer steel body and an internal lining made of bronze, or alternatively steel pistons protected by a chromium plating in cast iron liners, or finally pistons of nitrided austenitic steel comprising a total nickel and chromium content in the approximate range of from 24% to 32%, and having the same coefficient of thermal expansion as the bronze liners, may be used.

In another respect, while the pinions used in the pumps of the meshing-gear type may be mounted so as to mesh directly with a fixed annulus as described and shown, they might also be driven through auxiliary pinions meshing with said annulus.

Then again, the number of high points in the cams and the relative speed of the latter with respect to the rotor may differ from the figures indicated by way of example.

What I claim is:

1. A fuel-injection pump assembly for an internal combustion engine including a plurality of injection nozzles to which liquid fuel is to be supplied from a supply in a predetermined timed sequence and for predetermined lengths of time, which comprises in combination a rotor driven from said engine, discharge ducts in said rotor longitudinally thereof, volume pumping means in said rotor at one end thereof operative on rotation of the rotor to draw in fuel from said supply and discharge it into and through said ducts, delivery ports formed transversely in said rotor leading from intermediate points of said ducts adapted on rotation of said rotor to register periodically with said injector nozzles, and circumferentially-spaced longitudinally-elongated discharge ports formed transversely in said rotor adjacent the opposite end thereof leading from said ducts and discharging the fuel, and a stationary variably-settable timing ring member having tapering castellations surrounding said rotor in the region of said discharge ports to successively and cyclically seal said discharge ports in said predetermined time sequence and for said predetermined lengths of time to create corresponding pressure surges in said discharge ducts operative to force fuel through said related delivery ports into said injector nozzles upon registration therewith, means for adjusting the setting of said timing member in a circumferential direction to vary the point in each cycle at which said injection period starts and means for adjusting the setting of said timing member in a longitudinal direction to vary the duration of said cyclic injection period.

2. Fuel-injection pump assembly for supplying internal combustion engine injector nozzles with fuel from a supply in a predetermined time sequence and for predetermined lengths of time which comprises in combination a pump casing defining a fuel supply chamber and a fuel discharge chamber, a first pump means supplying said supply chamber, an engine-driven rotor in said casing having one end in said supply chamber and the other end in said discharge chamber, longitudinal ducts formed in said rotor and a second pump means in said rotor adjacent said one end thereof adapted to draw in fuel from said supply chamber and discharge it through said ducts, circumferentially-spaced elongated discharge ports in said rotor adjacent to said other end thereof leading from said ducts into said discharge chamber, delivery ports in said rotor leading from intermediate points of said ducts and registering periodically with said injection nozzles, a fixed variably-settable timing ring member having castellations tapering from root to tip surrounding said other rotor end to successively and cyclically seal said discharge ports to create pressure surges in said ducts effective to force fuel through said delivery ports into said nozzles upon their registration therewith, a first and a second diaphragm means in said casing responsive to the delivery pressure and the output capacity of said first pump means respectively and a push-pull rod and lever connection from each of said diaphragm means to said timing ring to alter its angular setting and its axial setting respectively.

3. In the assembly of claim 2, an adjustably-throttleable restriction in said first pump discharge means, pressure-transmitting means from a point upstream of said restriction into said first diaphragm means, and control means for adjustably throttling said restriction.

4. In the assembly of claim 3, an adjustably-restrictable annular duct constituting a laminar passage in said first pump discharge means, and pressure-transmitting means form a point upstream of said laminar passage into said second diaphragm means.

5. Fuel-injection assembly which comprises a casing defining a fuel-supply and -discharge chambers, a first pump means delivering fuel to said supply chamber, a rotor formed with longitudinal ducts and a second pump means in said rotor adjacent one end thereof adapted to draw fuel from said supply chamber and discharge it into said ducts, circumferentially-spaced elongated ports in the other end of said rotor leading from said ducts into said discharge chamber, delivery ports at an intermediate point in said rotor leading from said ducts, and injection nozzles with which said delivery ports are adapted to register periodically, a fixed taper-castellated timing ring member surrounding said other rotor end to successively and cyclically seal said discharge ports and means for varying the axial and the angular setting of said member, at least said first pumping means comprising equispaced sockets in a peripheral surface of said rotor, an annular surface of said casing-eccentrically surrounding said socketed rotor periphery, a roller-shaped piston slidable in each socket in sealing engagement therewith, spring means urging said pistons outwardly into rolling engagement with said eccentric annular surface, whereby in the rotation of the rotor said pistons define gradually increasing then decreasing cavities in said sockets, intake and discharge means for said first pump means from a fuel tank to said supply chamber, and intake and discharge means for said second pump means from said supply chamber into said rotor ducts, and fuel-return means from said discharge to said supply chamber.

6. A fuel-injection pump assembly for an internal combustion engine including a plurality of injection nozzles to which liquid fuel is to be supplied in a predetermined timed sequence and for predetermined lengths of time, which comprises in combination a casing, means in said casing defining a first fuel chamber, a rotor mounted for rotation in said first chamber, a gear coaxially arranged in said rotor and freely rotatable with respect thereto, a pair of pinions arranged in said rotor symmetrically with respect to said gear and meshing therewith, an annular gear in said chamber connected with the walls of said casing through a universal joint and also meshing with both said pinions, coupling means for driving said rotor from said engine, a shaft for said rotor rotatable within a cylindrical liner of said casing, each of said pinions forming with both said gears a pumping unit of the meshing gear type, intake means for said pumping units from said chamber, and discharge means from each of said units, comprising ducts formed longitudinally through said rotor shaft, delivery ports formed transversely through said rotor shaft walls and cooperating ports through said liner walls providing communication from said discharge ducts to said injector nozzles, a second fuel chamber in said casing, discharge ports formed transversely of said rotor shaft in another region thereof providing communication when open into said second chamber, means to return discharged fuel from said second chamber to a fuel supply, a general fuel supply pump of the volumetric type adapted to pump fuel from said supply to said first fuel chamber, a variably-settable castellated timing member cooperating with said rotor shaft in the region of said discharge ports to successively and cyclically seal said discharge ports in said predetermined timed sequence and for said predetermined lengths of time, and means for adjusting the setting of said timing member in a first direction to vary the point in each cycle at which said injection starts and in another direction to vary the duration of said injection periods.

7. A fuel-injection pump assembly for an internal combustion engine including a plurality of injection nozzles to which liquid fuel is to be fed in a predetermined timed sequence for predetermined lengths of time, which comprises in combination a casing, means in said casing defining a first fuel chamber, a rotor mounted for rotation in said casing, coupling means for driving said rotor from said engine, a shaft for said rotor rotatable within a cylindrical liner of said casing, pump units in said casing, each of said units comprising a pump barrel and a piston slidable therein, a rocker arm for each piston, spring means urging said pistons outwardly of the related barrels, and into engagement with the related rocker arm, cam means rotatable on said rotor shaft and controlling said rocker arms and thereby said pistons, and gear means to drive said cam from said rotor, intake means for said pump units from said fuel chamber; and discharge means from said pump units including a longitudinal duct through said rotor shaft, a delivery port formed transversely through said rotor shaft and cooperating ports providing communication from said delivery port into said injector nozzles, a second fuel chamber defined in said casing, discharge ports formed transversely of said rotor shaft in another region thereof providing communication when open into said second chamber, means to return discharged fuel from said second chamber to a fuel supply, a general fuel supply pump of the volumetric type adapted to pump fuel from said supply to said first fuel chamber, a variably-settable timing member cooperating with said rotor shaft in the region of said discharge ports therein to successively and cyclically seal said discharge ports in said predetermined timed sequence and for said predetermined lengths of time and means for adjusting the setting of said timing member in a first direction to vary the point in each cycle at which said injection periods start and in another direction to vary the duration of said periods.

8. The pumping assembly of claim 7 wherein said gear means for driving said cam means comprise a gear rigid with said cam, an annular gear, a universal joint means connecting said annular gear with said casing, and planetary pinions meshing with both said gears.

9. Fuel-injection assembly which comprises a casing defining a fuel-supply and -discharge chambers, a common supply pump means delivering fuel into said supply chamber, a rotor formed with a plurality of longitudinal ducts and a plurality of further pumping units in said rotor adjacent one end thereof each discharging into a related one of said ducts, circumferentially-spaced elongated ports in the other end of said rotor leading from said ducts into said discharge chamber, delivery ports at an intermediate point in said rotor leading from said ducts, and injection nozzles with which said delivery ports are adapted to register periodically, a fixed taper-castellated timing ring member surrounding said other rotor end to successively seal said discharge ports and means for varying the axial and angular setting of said member, said pumping units comprising a pump barrel in said rotor arranged with its respective axes tangential to a transverse circumference of the rotor, a piston in the barrel, rocker arms pivoted on said rotor and spring means urging said piston out of its cylinder and against a related one of said rocker arms, a cam-follower means at the opposite end of the rocker arm and a cam freely-rotatable on said rotor coaxially therewith to actuate said pistons through said rocker arms, and gear means from said casing to said cam to drive said cam at a predetermined ratio relatively to said rotor.

10. Fuel-injection assembly which comprises a casing defining fuel-supply and -discharge chamber, a first pump means delivering fuel to said supply chamber, a rotor formed with longitudinal ducts and a second pump means in said rotor adjacent one end thereof adapted to draw fuel from said supply chamber and discharge it into said ducts, circumferentially spaced elongated ports in the other end of said rotor leading from said ducts into said discharge chamber, delivery ports at an intermediate point in said rotor leading from said ducts and injection nozzles with which said delivery ports are adapted cyclically to register, a fixed taper-castellated timing ring member surrounding said other rotor end to cyclically seal said discharge ports, a first and a second diaphragm-defined chamber in said casing, an adjustably-throttleable restriction in the discharge from said first pump and an adjustably-throttleable annular duct in said first pump discharge means through which said fuel is adapted to flow in laminar conditions, pressure-transmitting means from a point upstream of said restriction and said annular duct respectively to said first and said second diaphragm-defined chambers, a push-pull rod connected with each diaphragm and lever means actuated by said respective push-pull rods to alter the axial and the angular setting of said timing ring respectively automatically as a function of the pressure of said fuel supply and the speed of said engine, and manual control means operable from outside said casing to manually set said timing ring member in such a way as to obtain momentarily increased injection durations and injection leads, and manual means for positively cutting off the fuel injection.

JULES MARIE RENÉ RETEL.

REFERENCES CITED

The following references are of record in the file of this patent:

UNITED STATES PATENTS

| Number | Name | Date |
|---|---|---|
| 2,052,549 | Alden | Sept. 1, 1936 |
| 2,447,265 | Beardsley, Jr. | Aug. 17, 1948 |
| 2,474,396 | Groves | June 28, 1949 |

FOREIGN PATENTS

| Number | Country | Date |
|---|---|---|
| 868,586 | France | Oct. 6, 1941 |